United States Patent
Sluz et al.

(10) Patent No.: US 10,439,733 B2
(45) Date of Patent: Oct. 8, 2019

(54) FIBER OPTIC CIRCUIT BREAKER

(71) Applicant: The Johns Hopkins University, Baltimore, MD (US)

(72) Inventors: Joseph E. Sluz, Ellicott City, MD (US); Michael L. Dennis, Ellicott City, MD (US); Eric J. Adles, Ellicott City, MD (US); Raymond M. Sova, Reisterstown, MD (US); Chun-Huei Bair, Silver Spring, MD (US); Darrell A. Zinn, Clarksville, MD (US); Edward H. Darlington, Jessup, MD (US)

(73) Assignee: The Johns Hopkins University, Baltimore, MD (US)

( * ) Notice: Subject to any disclaimer, the term of this patent is extended or adjusted under 35 U.S.C. 154(b) by 504 days.

(21) Appl. No.: 14/591,948

(22) Filed: Jan. 8, 2015

(65) Prior Publication Data

US 2015/0198768 A1    Jul. 16, 2015

Related U.S. Application Data

(60) Provisional application No. 61/926,459, filed on Jan. 13, 2014.

(51) Int. Cl.
| | |
|---|---|
| *H03K 17/78* | (2006.01) |
| *H04B 10/67* | (2013.01) |
| *H04B 10/032* | (2013.01) |
| *H04B 10/079* | (2013.01) |
| *H04J 14/02* | (2006.01) |

(52) U.S. Cl.
CPC ........... *H04B 10/67* (2013.01); *H04B 10/032* (2013.01); *H04B 10/0795* (2013.01); *H04B 10/07955* (2013.01); *H04B 10/672* (2013.01); *H04J 14/0294* (2013.01)

(58) Field of Classification Search
CPC .. H04B 10/67; H04B 10/032; H04B 10/0795; H04B 10/672; H04B 10/07955; H04Q 11/0067; H04J 14/0294
USPC .................................................... 250/227.14
See application file for complete search history.

(56) References Cited

U.S. PATENT DOCUMENTS

| | | | |
|---|---|---|---|
| 4,878,144 A | 10/1989 | Nebon | |
| 5,278,686 A * | 1/1994 | Grasso | H04B 10/077 359/341.2 |

(Continued)

FOREIGN PATENT DOCUMENTS

WO    2004111665    12/2004

*Primary Examiner* — Thanh Luu
*Assistant Examiner* — Kevin Wyatt
(74) *Attorney, Agent, or Firm* — Todd R. Farnsworth (57) ABSTRACT

An optical circuit breaker includes a main optical transmission path including an optical coupler, a delay line and a protection device, and a parallel protection path configured to receive a tapped portion of a signal provided to the main optical transmission path and generate a reference signal based on the tapped portion. The protection device may be configured to be triggered to prevent an overpower condition from passing through the optical circuit breaker responsive to the reference signal exceeding a user selectable threshold. The delay line may be configured to have a longer delay than a time it takes for the protection device to be triggered via the parallel protection path.

20 Claims, 4 Drawing Sheets (56) References Cited

U.S. PATENT DOCUMENTS

| | | | | |
|---|---|---|---|---|
| 5,444,563 | A * | 8/1995 | Forsberg | H04B 10/503 375/211 |
| 5,710,846 | A * | 1/1998 | Wayman | G02B 6/3502 385/15 |
| 5,986,799 | A * | 11/1999 | Itou | H01S 3/1301 359/337 |
| 6,218,658 | B1 | 4/2001 | Taneda et al. | |
| 6,229,680 | B1 | 5/2001 | Shea | |
| 6,366,724 | B1 * | 4/2002 | Jennings | H04B 10/00 372/29.01 |
| 6,415,075 | B1 | 7/2002 | DeRosa et al. | |
| 6,757,626 | B2 | 6/2004 | Dougherty et al. | |
| 7,162,161 | B2 | 1/2007 | Wyatt et al. | |
| 7,297,922 | B2 | 11/2007 | Giovannini et al. | |
| 7,403,684 | B2 | 7/2008 | Todoroki | |
| 7,612,161 | B2 | 11/2009 | Hayward et al. | |
| 7,633,730 | B2 | 12/2009 | Boeder et al. | |
| 7,747,120 | B2 | 6/2010 | Seo et al. | |
| 8,014,115 | B2 | 9/2011 | Vicente et al. | |
| 2001/0046074 | A1 * | 11/2001 | Kakizaki | H04B 10/032 398/5 |
| 2002/0121587 | A1 * | 9/2002 | Becht | G01J 1/04 250/201.1 |
| 2003/0035187 | A1 * | 2/2003 | Richardson | G02B 6/02085 398/202 |
| 2003/0077030 | A1 * | 4/2003 | Oberg | H04B 1/74 385/24 |
| 2004/0120642 | A1 * | 6/2004 | Hayes | G02B 6/2808 385/32 |
| 2005/0231736 | A1 * | 10/2005 | Jeffers | G01D 5/268 356/615 |
| 2009/0136239 | A1 * | 5/2009 | Izumi | H04J 14/086 398/147 |
| 2010/0061680 | A1 | 3/2010 | Oron et al. | |
| 2010/0183298 | A1 * | 7/2010 | Biegert | H04Q 11/0067 398/17 |
| 2011/0220776 | A1 * | 9/2011 | Abedin | G01M 11/3145 250/205 |

* cited by examiner

FIBER OPTIC CIRCUIT BREAKER

CROSS-REFERENCE TO RELATED APPLICATION

This application claims priority to and the benefit of prior-filed, U.S. Provisional Application Ser. No. 61/926,459 filed on Jan. 13, 2014, the entire contents of which is hereby incorporated herein by reference.

STATEMENT OF GOVERNMENTAL INTEREST

This invention was made with government support under contract number H98230-09-D-0040 awarded by the Maryland Procurement Office (MPO). The government has certain rights in the invention.

TECHNICAL FIELD

Exemplary embodiments of the present disclosure generally relate to circuitry employing optical devices, and more specifically relate to an optical circuit breaker that protects sensitive optical components.

BACKGROUND

Electrical circuits use a variety of over-power protection elements. Some common examples may include fuses, circuit breakers, polymer-based thermal fuses and/or the like. Fiber optic technology does not have similar technologies that are readily available. In some cases, fuse-like functions have been defined for optical fibers. However, these components typically have relatively slow response times. Thus, such components may not be effective at protecting certain components that require fast response times in order to be effectively protected. Furthermore, some optical components operate at power levels that are too low to cause fuse-like protection devices to effectively operate.

Meanwhile, optical data rates continue to increase and associated detector bandwidth becomes larger and larger. High bandwidth detectors require reduced dimensions and make the detectors much more susceptible to damage at higher optical power levels. High bandwidth detectors are also typically relatively expensive, so each damage event can have a large programmatic impact. Expensive test equipment having expensive optical receivers (sometimes multiple such receivers per assembly) may often be the last item in a fiber experimental test bed that can contain multiple optical fiber amplifiers. The presence of multiple optical amplifiers in a system can create large power bursts if the power at the input to the system chain is altered suddenly. This could cause instant destruction of sensitive photoreceivers and terminate the system, while costing a large amount of money.

To address some of these drawbacks, solutions have been sought in the area of high speed optical fiber technology. The provision of high speed, low cost optical protection devices may therefore be of interest.

BRIEF SUMMARY OF SOME EXAMPLES

Some example embodiments may enable the provision of a high speed and low cost optical circuit breaker device that can protect photoreceivers and other optical devices in a manner similar to the way an electrical fuse or circuit breaker might operate.

In one example embodiment, an optical circuit breaker is provided. The optical circuit breaker may include a main optical transmission path including an optical coupler, a delay line and a protection device, and a parallel protection path configured to receive a tapped portion of a signal provided to the main optical transmission path and generate a reference signal based on the tapped portion. The protection device may be configured to be triggered to prevent an overpower condition from passing through the optical circuit breaker responsive to the reference signal exceeding a user selectable threshold. The delay line may be configured to have a longer delay than a time it takes for the protection device to be triggered via the parallel protection path.

BRIEF DESCRIPTION OF THE SEVERAL VIEWS OF THE DRAWING(S)

Having thus described some embodiments of the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

As mentioned above, some example embodiments may enable the provision of a high speed and low cost protective device (e.g., optical circuit breaker) that can protect photoreceivers or other optical devices. In this regard, an example embodiment may provide a parallel protection path in which a portion of an optical signal can be analyzed to determine whether protection should be triggered while the main signal is passed through a delay line that has a longer delay than the time it takes for the parallel protection path to operate. The parallel protection path can be embodied entirely in hardware, or may employ some software aspects. But in any case, protection can be provided either by attenuating output signals or opening a switch to prevent damage to the protected component when the parallel protection path detects a problem. In some embodiments, the user may further be enabled to interact with the device to directly change the levels or setpoints at which protection is initiated.

Figure 1:
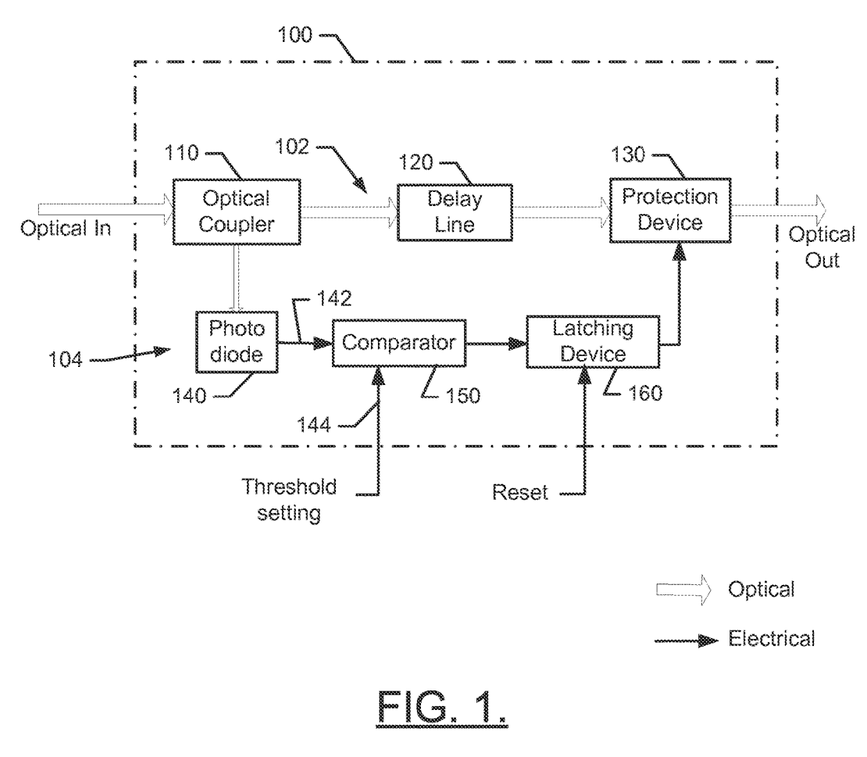
FIG. 1 illustrates a block diagram showing an optical circuit breaker in accordance with an example embodiment.

FIG. 1 illustrates a block diagram showing an optical circuit breaker 100 in accordance with an example embodiment. In this regard, as shown in FIG. 1, the optical circuit breaker 100 may include an optical coupler 110 that may be configured to provide a signal indicative of power level of an optical input signal provided into the optical circuit breaker 100 to a parallel protection path 104 (i.e., the bottom path in FIG. 1) that parallels the main optical transmission path 102 (shown as the top path in FIG. 1). The main optical transmission path 102 may further include a delay line 120 and a protection device 130 before the optical output of the optical circuit breaker 100 device is reached.

In some embodiments, the optical coupler 110 may be embodied as an optical power tap that couples a relatively small amount of the incoming optical power to, for example, a photodiode 140. The power tapped off from the main optical transmission path 102 (i.e., the tapped optical signal) may be small, but still proportional to the magnitude of the optical input signal. Thus, as the optical input signal increases in power, the magnitude of the power tapped off from the main optical transmission path 102 may increase proportionally.

In an example embodiment, the photodiode 140 may convert the tapped optical signal from an optical signal to an electrical signal that may be provided to a comparator 150. The output of the photodiode 140 may, in some cases, be amplified prior to reaching the comparator 150, but such amplification is not required. The comparator 150 may include one or more operational amplifiers configured accordingly, or any other hardware structure that is configurable to compare a reference signal 142, which is an electrical signal proportional to the tapped optical signal, to a threshold setting 144. The comparator 150 may be configured to be triggered when the incoming level (i.e., the reference signal 142) is greater than the threshold setting 144. Of note, the threshold setting 144 may be adjusted by the user.

In an example embodiment, the output of the comparator 150 may be used to drive a latching device 160. The latching device 160 may be configured to maintain a constant output if a rising edge is detected to drive the protection device 130. The protection device 130 may be configured to interrupt or attenuate power along the main optical transmission path 102 in response to activation of the latching device 160 when the comparator 150 detects the reference signal 142 exceeding the threshold setting 144. In an example embodiment, the protection device 130 may be configured to have sufficient range to limit power to safe levels if attenuation is preferred to signal interruption.

Since the latching device 160 is configured to maintain a constant output when a rising edge is detected (i.e., when the comparator 150 detects the reference signal 142 greater than the threshold setting 144), the latching device 160 will stay in an activated state and keep the protection device 130 similarly activated (to interrupt or attenuate power attempting to pass therethrough) until the latching device 160 is reset. Accordingly, the user may be enabled to activate a reset function relative to the latching device 160. Generally speaking, the user should ensure that the over-power condition has cleared before attempting to reset the latching device 160 is reset, or repeated tripping of the protection device 130 may be experienced. Alternatively, the latching configuration could be designed to self-reset once the overload condition goes away.

As mentioned above, the delay line 120 may be selected to have a propagation time sufficient to make the time it takes to activate the protection device 130 via operation of components in the parallel protection path 104 shorter than the time it takes for the optical input signal to pass through the main optical transmission path 102 to the optical output of the optical circuit breaker 100. As such, the delay line 120 is selected or otherwise configured to have low losses, but still have a longer delay time associated therewith than the time it takes to trigger the protection device 130 via operation of components in the parallel protection path 104.

Figure 2:
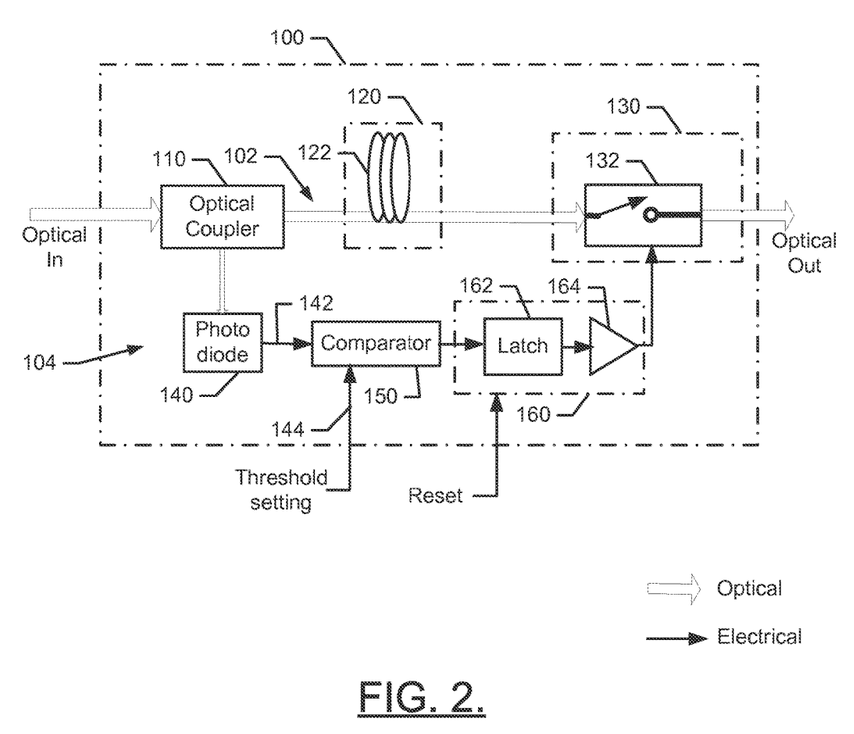
FIG. 2 illustrates a block diagram showing some components that may be employed to provide the optical circuit breaker in accordance with an example embodiment.
Figure 3:
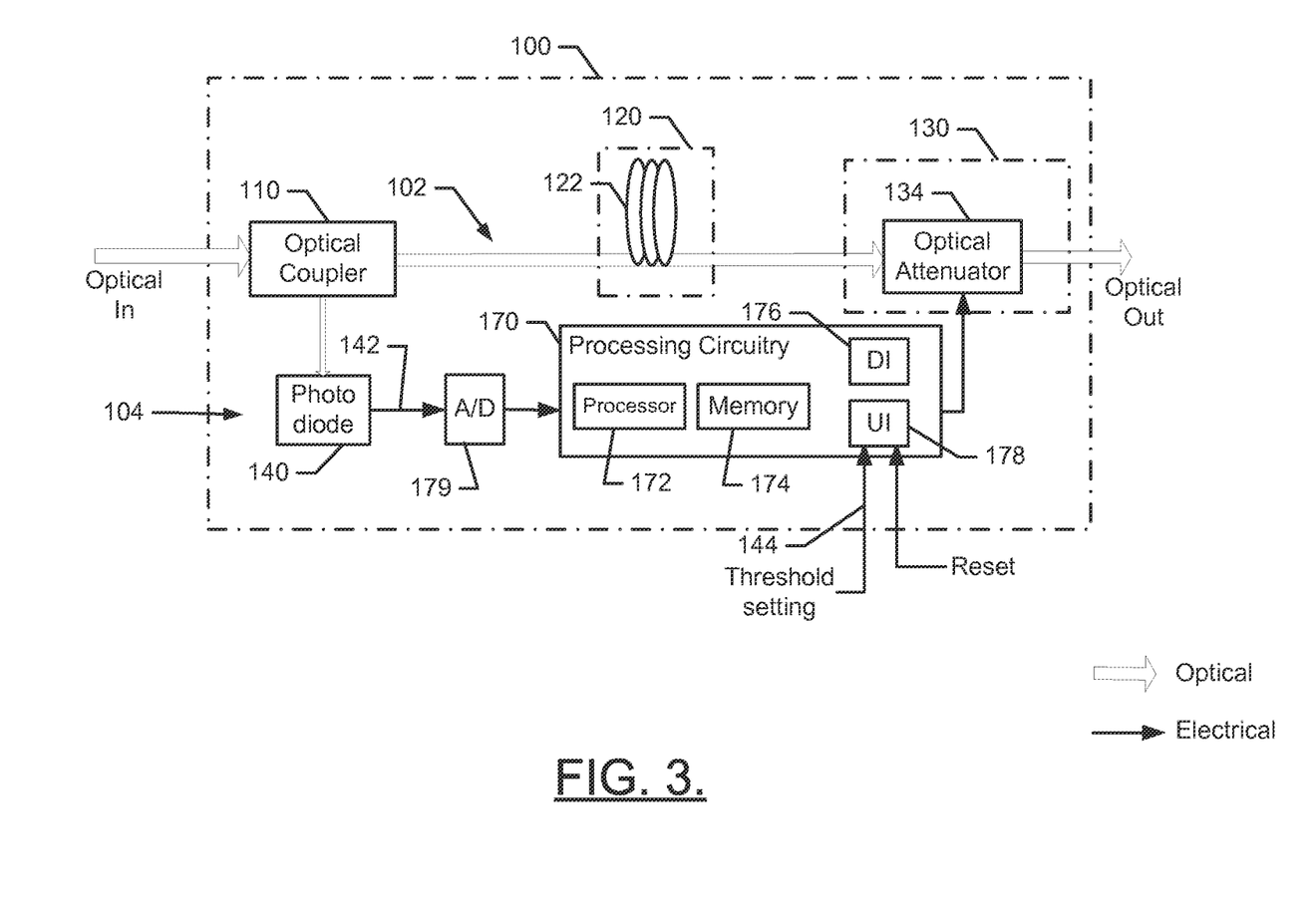
FIG. 3 illustrates a block diagram showing some components that may be employed to provide the optical circuit breaker in accordance with an alternate example embodiment.
Figure 4:
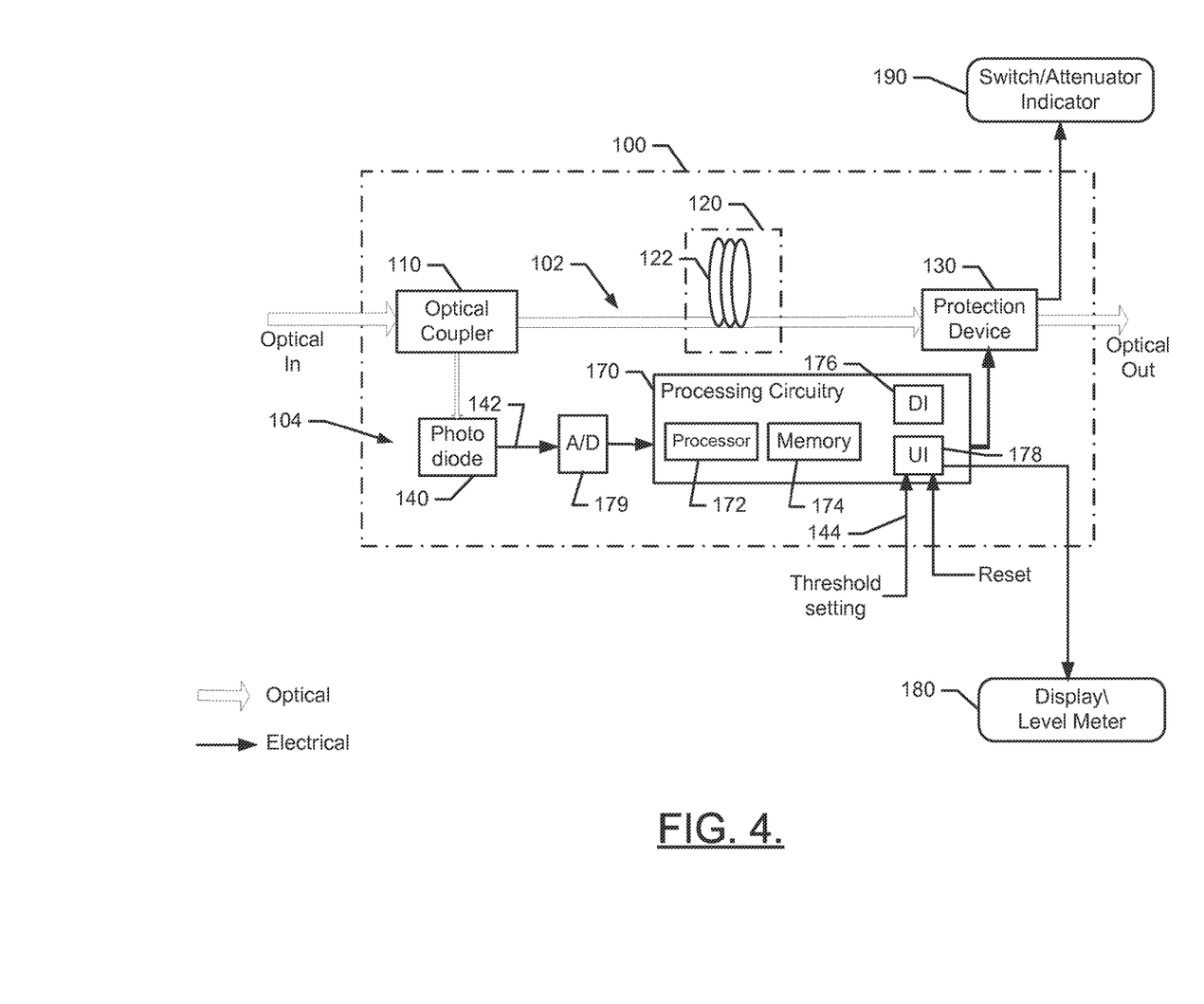
FIG. 4 illustrates a block diagram showing some components that may be employed to provide the optical circuit breaker in accordance with still another example embodiment.

Of note, the example of FIG. 1 can be achieved using a number of different component assemblies. Some specific examples are shown in FIGS. 2-4 and described herein. In this regard, FIG. 2 illustrates a block diagram showing some components that may be employed to provide the optical circuit breaker 100 in accordance with an example embodiment. As shown in FIG. 2, the delay line 120 may be embodied as a fiber coil 122 having a series of tight bends and/or sufficient length to provide a propagation time of sufficient length to allow the protection device 130 to be tripped before an optical input signal would otherwise reach the optical output of the optical circuit breaker 100. As mentioned above, the fiber coil 122 may be selected and configured to minimize line losses, while providing at least a sufficient amount of delay.

In some cases, the latching device 160 may include a latch 162 and a driver 164 that work together to operate as described above 160. In this regard, the latch 162 may maintain a high output in response to detection of a transition of the comparator 150 from a low value (when the reference signal 142 is less than the threshold setting 144) to a high value (when the reference signal 142 is greater than the threshold setting 144).

As shown in FIG. 2, the protection device 130 may be embodied as a switch 132. The switch 132 may remain normally closed. However, when the driver 164 provides a trigger signal, the switch 132 may be tripped and the normally closed contacts of the switch 132 may be opened. Opening of the switch 132 may completely open the main optical transmission path 102 to protect an optical device (e.g., a photoreceiver and/or the like) that may be operably coupled to the optical output of the optical circuit breaker 100.

The components in the parallel protection path 104 of FIG. 2 may generally be analog components. Thus, such components can be selected to have relatively high speeds, and may also be relatively cheap. The optical circuit breaker 100 may therefore be provided to have a relatively low cost, but still be able to protect expensive and/or important optical devices from optical signals at various power levels. Again, the user may select the threshold setting 144, so the optical circuit breaker 100 can be used to protect devices having different sensitivities and can be employed quite easily in different testing environments with different components being tested.

As an alternative to using analog, high speed components for the parallel protection path 104, some embodiments may employ digital components and/or protection devices that employ software to configure hardware to operate in a manner consistent with the description above. In this regard, FIG. 3 illustrates a block diagram showing some components that may be employed to provide the optical circuit breaker in accordance with an alternate example embodiment. As shown in FIG. 3, the comparator function and latching functions provided using analog components in FIG. 2, may be replaced with processing circuitry 170 that is configurable to perform the protective functions described above. To achieve this, the processing circuitry 170 may include a processor 172 and memory 174. In some cases, the processing circuitry 170 may also include or otherwise be in communication with a device interface 176 and/or a user interface 178. Since the processing circuitry 170 may operate on digital circuit principles, an analog to digital converter 179 may be provided to convert the analog output of the photodiode 140 into a digital signal before it is fed into the processing circuitry 170.

As can be appreciated from the example of FIG. 3, the reference signal 142 may be digitized (via the analog to digital converter 179) prior to comparison to the threshold setting in cases where processing circuitry 170 performs the latching and comparator functions. However, in the example of FIG. 2, the reference signal 142 and the threshold setting 144 (or at least the signal based on the threshold setting and to which the reference signal 142 is compared) may each be analog signals.

In an example embodiment, the optical circuit breaker 100 may include or otherwise be in communication with a power unit (not shown) that may be embodied, for example, as a battery or battery pack. However, mains power may be applied in some cases. The optical circuit breaker 100 may be embodied in a mobile or fixed structure with input and output terminals to connect to a test set having an illuminator of some type and an optical device to be protected.

The processing circuitry 170 may be configurable to perform actions in accordance with example embodiments described herein. As such, for example, at least some of the functions attributable to the optical circuit breaker 100 (and/or entities/components of the parallel protection path 104 in particular) may be carried out by or otherwise instructed by the processing circuitry 170. The processing circuitry 170 may therefore be configured to perform data processing, control function execution and/or other processing and management services according to an example embodiment of the present invention. In some embodiments, the processing circuitry 170 may be embodied as a chip or chip set. In other words, the processing circuitry 170 may comprise one or more physical packages (e.g., chips) including materials, components and/or wires on a structural assembly (e.g., a baseboard).

In an example embodiment, the processing circuitry 170 may include one or more instances of a processor 172 and memory 174 that may be configured to enable the processing circuitry 170 to compare the threshold setting 144 to the reference signal 142 and provide a trip signal to the protection device 130 when the reference signal 142 is greater than the threshold setting 144. As such, the processing circuitry 170 may be embodied as a circuit chip (e.g., an integrated circuit chip) configured (e.g., with hardware, software or a combination of hardware and software) to perform operations described herein and such chip may be in the parallel protection path 104 to trip the protection device 130 when the desired trigger conditions have been met (i.e., when the reference signal 142 is greater than the threshold setting 144).

In an exemplary embodiment, the memory 174 may include one or more non-transitory memory devices such as, for example, volatile and/or non-volatile memory that may be either fixed or removable. The memory 174 may be configured to store information, data, instructions or the like for enabling the processing circuitry 170 to carry out various functions in accordance with exemplary embodiments of the present invention. For example, the memory 174 could be configured to buffer input data for processing by the processor 172. Additionally or alternatively, the memory 174 could be configured to store instructions for execution by the processor 172. As yet another alternative, the memory 174 may include one or more databases or registers that may store data fed into the databases and/or registers to indicate digital values representative of the reference signal 142 and/or the threshold setting 144 for comparisons there between. In some cases, the memory 174 may store instructions for providing a particular output or interface mechanism based on corresponding specific triggering stimuli.

The processor 172 may be embodied in a number of different ways. For example, the processor 172 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 172 may be configured to execute instructions stored in the memory 174 or otherwise accessible to the processor 172. As such, whether configured by hardware or by a combination of hardware and software, the processor 172 may represent an entity (e.g., physically embodied in circuitry—in the form of processing circuitry 170) capable of performing operations according to embodiments of the present invention while configured accordingly. Thus, for example, when the processor 172 is embodied as an ASIC, FPGA or the like, the processor 172 may be specifically configured hardware for conducting the operations described herein. Alternatively, as another example, when the processor 172 is embodied as an executor of software instructions, the instructions may specifically configure the processor 172 (which could in some cases otherwise be a general purpose processor until configured accordingly) to perform the operations described herein. In particular, as indicated above, the processor 172 may be configured to perform the thresholding and latching functions described above.

The device interface 176 may include one or more interface mechanisms for enabling communication with other external devices (e.g., the protection device 130 and/or the photodiode 140) or internal functional components of the processing circuitry 270. In some cases, the device interface 176 may be any means such as a device or circuitry embodied in either hardware, or a combination of hardware and software that is configured to receive and/or transmit signals from/to devices in communication with the processing circuitry 170.

The user interface 178 may be in communication with the processing circuitry 170 to receive an indication of a user input at the user interface 178 and/or to provide an audible, visual, mechanical or other output to the user. As such, the user interface 178 may include, for example, a display, one or more buttons or keys (e.g., function buttons), and/or other input/output mechanisms. The user interface 178 may display information indicating a control console or other mechanism for entering the threshold setting 144 and/or for resetting the latching function.

As shown in FIG. 3, instead of the switch 132 of FIG. 2, some embodiments may employ an optical attenuator 134. The optical attenuator 134 and switch 132 may be interchangeable in various embodiments depending upon the requirements of the user and the situation. When the optical attenuator 134 is employed, the optical attenuator 134 may be configured to sufficiently limit any range of power levels that might trip the latching device 160 (or processing circuitry 170) to actuate the optical attenuator 134 so that such power levels at the output do not exceed the power levels that can safely be provided to the optical device being protected by the optical circuit breaker 100. Thus, the optical attenuator 134 may be configured to reduce the power level of a signal passing through the main optical transmission path 102 responsive to tripping of the latching device 160 (or processing circuitry 170) as described above.

Although the processing circuitry 170 may be highly configurable and therefore add flexibility, it may be appreciated that the high speed requirements for some optical circuits may further require that the processing circuitry 170 be correspondingly high speed (and potentially higher cost). Thus, some embodiments may be preferably employed in the context of the cheaper analog components described above. However, to the extent the speed and cost issues are properly addressed and/or balanced, employing processing circuitry 170 may enable additional functions to also be supplied by example embodiments. In this regard, yet further functionality may be added and/or supported by virtue of the inclusion of the processing circuitry 170. FIG. 4 illustrates an example of some additional functionality that may be provided.

In this regard, FIG. 4 illustrates a block diagram showing some components that may be employed to provide the optical circuit breaker in accordance with still another example embodiment. As shown in FIG. 4, the user interface 178 may be configured to include or otherwise interface with a display and/or level meter 180. Thus, for example, the display of the user interface 178 may indicate a measure of the signal being passed through the main optical transmission path 102 (e.g., by measuring the tapped optical signal and estimating a corresponding power of the signal passing through the main optical transmission path 102) via the display and/or level meter 180.

In some embodiments, the optical circuit breaker 100 may further include or otherwise interface with an indicator (e.g., switch/attenuator indicator 190) that may be configured to indicate to the user when the protection device 130 is activated so that power is interrupted or suppressed by operation of the protection device 130 (e.g., via operation of either the switch 132 or the optical attenuator 134. The indictor may be an LED light or other such indicator that can demonstrate to the user that the protection device 130 has been tripped or activated. Of note, although the indicator and the display and/or level meter 180 are shown in FIG. 4 as being provided in connection with an embodiment employing processing circuitry 170 to perform thresholding and latching functions, it should be appreciated that the indicator and/or the display and/or level meter 180 could also be employed in connection with the example of FIG. 2 (e.g., where analog components are employed for thresholding and latching functions. Moreover, various ones of the components shown in FIGS. 2-4 could be interchanged in some example embodiments.

According to an example embodiment, an optical circuit breaker may include a main optical transmission path including an optical coupler, a delay line and a protection device, and a parallel protection path configured to receive a tapped portion of a signal provided to the main optical transmission path and generate a reference signal based on the tapped portion. The protection device may be configured to be triggered to prevent an overpower condition from passing through the optical circuit breaker responsive to the reference signal exceeding a user selectable threshold. The delay line may be configured to have a longer delay than a time it takes for the protection device to be triggered via the parallel protection path.

In some cases, the optical circuit breaker may be modified with various optional augmentations or additional features. For example, in some embodiments, an illuminator may provide the signal to the optical circuit breaker, and a photoreceiver may receive an output of the optical circuit breaker. In some embodiments, the optical coupler may provide the tapped portion to a photodiode of the parallel protection path. The photodiode may convert the tapped portion from an optical signal to an electrical signal comprising the reference signal. In an example embodiment, the parallel protection path may include a comparator configured to compare the reference signal to the user selectable threshold and generate a rising edge for detection at a latching device in response to the reference signal being greater than the user selectable threshold. In some cases, the latching device may be configured to trigger the protection device responsive to detecting the rising edge. In some embodiments, the latching device may be further configured to maintain the protection device triggered until a reset input is provided to the latching device by the user. In an example embodiment, the latching device may include a latch and a driver. The latching device and the comparator may sometimes be assembled from analog components. In an example embodiment, the protection device may include a switch configured to interrupt provision of the signal to an output of the optical circuit breaker responsive to triggering of the protection device. In some cases, the protection device may include an optical attenuator configured to reduce power of the signal to generate an attenuated signal to an output of the optical circuit breaker responsive to triggering of the protection device. In some embodiments, the reference signal and the user selectable threshold each comprise analog signals. Alternatively, the reference signal may be an analog signal that is digitized for comparison to the user selectable threshold (which is digital as well). In an example embodiment, the parallel protection path may include processing circuitry configured to compare the reference signal to the user selectable threshold and trigger the protection device in response to the reference signal being greater than the user selectable threshold. In some cases, the optical circuit breaker may further include a user interface via which the user selectable threshold is provided. The user interface may be further configured to enable the user to reset the processing circuitry after the protection device has been triggered. Alternatively or additionally, the user interface may be further configured to provide an indication of a power value of the signal (e.g., based on the tapped portion). In some cases, the delay line comprises a fiber loop having a series of tight bends and sufficient length to provide a propagation time greater than the time it takes for the protection device to be triggered via the parallel protection path. In some cases, the optical circuit breaker may further include an indicator operably coupled to the protection device to indicate when the protection device has been triggered.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An optical circuit breaker comprising:
a main optical transmission path including an optical coupler, a delay line and a protection device, the main optical transmission path configured to transmit an optical input signal from the optical coupler through the delay line and to the protection device, wherein the optical input signal is received at an input to the optical circuit breaker from an illuminator, and the optical input signal is provided from the protection device to a photoreceiver via an output of the optical circuit breaker; and
a parallel protection path configured to:
receive a tapped portion of the optical input signal from the optical coupler,
generate a reference signal based on the tapped portion of the optical input signal, the reference signal being proportional in magnitude to the optical input signal, and
compare the reference signal to a user selectable threshold to generate a trigger signal;
wherein the protection device is configured to be triggered, in response to the trigger signal indicating that the reference signal exceeds the user selectable threshold, to prevent damage to the photoreceiver by stopping an illuminator overpower condition from passing through the optical circuit breaker to the photoreceiver, and wherein the delay line is configured to have a longer delay than a time for the protection device to be triggered via the parallel protection path.

2. The optical circuit breaker of claim 1, wherein the optical coupler provides the tapped portion to a photodiode of the parallel protection path, the photodiode converting the tapped portion from an optical signal to an electrical signal comprising the reference signal.

3. The optical circuit breaker of claim 1, wherein the parallel protection path comprises a comparator configured to compare the reference signal to the user selectable threshold and generate the trigger signal as a rising edge for detection at a latching device in response to the reference signal exceeding the user selectable threshold.

4. The optical circuit breaker of claim 3, wherein the latching device is configured to trigger the protection device responsive to detecting the rising edge.

5. The optical circuit breaker of claim 4, wherein the latching device is further configured to maintain the protection device triggered until a reset input is provided to the latching device by the user.

6. The optical circuit breaker of claim 4, wherein the latching device comprises a latch and a driver.

7. The optical circuit breaker of claim 3, wherein the latching device and the comparator are assembled from analog components.

8. The optical circuit breaker of claim 1, wherein the protection device comprises a switch configured to interrupt provision of the optical input signal to the output of the optical circuit breaker responsive to triggering of the protection device.

9. The optical circuit breaker of claim 1, wherein the protection device comprises an optical attenuator configured to reduce power of the optical input signal to attenuate the optical input signal for provision to the output of the optical circuit breaker responsive to triggering of the protection device.

10. The optical circuit breaker of claim 1, wherein the reference signal and the user selectable threshold each comprise analog signals.

11. The optical circuit breaker of claim 1, wherein the reference signal is an analog signal that is digitized for comparison to the user selectable threshold.

12. The optical circuit breaker of claim 1, wherein the parallel protection path comprises processing circuitry configured to compare the reference signal to the user selectable threshold and trigger the protection device in response to the reference signal exceeding the user selectable threshold.

13. The optical circuit breaker of claim 12, further comprising a user interface via which the user selectable threshold is provided.

14. The optical circuit breaker of claim 13, wherein the user interface is further configured to enable the user to reset the processing circuitry after the protection device has been triggered.

15. The optical circuit breaker of claim 13, wherein the user interface is further configured to provide an indication of a power value of the optical input signal.

16. The optical circuit breaker of claim 15, wherein the indication of the power value is determined based on the tapped portion.

17. The optical circuit breaker of claim 1, wherein the delay line comprises a fiber loop.

18. The optical circuit breaker of claim 17, wherein the fiber loop comprises a length of fiber arranged in a series of bends to provide a propagation time greater than the time for the protection device to be triggered via the parallel protection path.

19. The optical circuit breaker of claim 1, further comprising an indicator operably coupled to the protection device to indicate when the protection device has been triggered.

20. The optical circuit breaker of claim 1, wherein the delay of the delay line is longer than an operation time of components of the parallel protection path, the operation time of the components of the parallel protection path including a comparison operation time for comparing the reference signal to the user selectable threshold.

* * * * *